3,583,947
PROCESS FOR POLYMERIZING β-LACTAMS
Erwin Schmidt, Frankfurt am Main, Claus Beermann, Neu-Isenburg, Gerhard Lohaus, Kelkheim, Taunus, and Franz Landauer, Frankfurt am Main, Germany, assignors to Farbwerke Hoechst Aktiengesellschaft vormals Meister Lucius & Bruning, Frankfurt am Main, Germany
No Drawing. Continuation-in-part of application Ser. No. 438,422, Mar. 9, 1965. This application Mar. 21, 1968, Ser. No. 714,801
Claims priority, application Germany, Mar. 18, 1964, F 42,357
The portion of the term of the patent subsequent to Dec. 17, 1985, has been disclaimed
Int. Cl. C08g 20/10
U.S. Cl. 260—78                    18 Claims

ABSTRACT OF THE DISCLOSURE

Poly-β-amides are prepared in a two-phase dispersion by polymerizing β-lactams which are unsubstituted at the nitrogen atom. One of the phases consists of an aliphatic or a cycloaliphatic hydrocarbon and the other of a solution of the lactam in a highly polar solvent. The preparation is carried out in the presence of catalysts, promoters and emulsifiers. The poly-β-amides produced are suitable for the manufacture of molded articles, films and filaments.

---

The present application is a continuation-in-part of our application Ser. No. 438,422, filed Mar. 9, 1965, now abandoned.

It is known that α-pyrrolidone can be polymerized in disperse phase when aliphatic hydrocarbons are used as diluent to which rubber-like polymers have been added as an emulsifying auxiliary (cf. Belgian Pat. 619,486). When this method is used for polymerizing β-lactams the results obtained are very unsatisfactory. If β-lactam polymers are to be produced in this manner in granular form highly viscous polymers must be added as thickening agents whereby the working up of the polymerization product from the very viscous outer phase is rendered very difficult. In this manner polymers are obtained the main quantity of which consists of coagulated material while the remainder has very different granular sizes. The use of conventional emulsifiers consisting of a hydrophilic group and one or several aliphatic radicals with up to 18 carbon atoms does not improve the result to a satisfactory extent.

It has now been found that β-lactams, which are unsubstituted at the nitrogen atom, can be polymerized in a dispersion, one phase of which consists of aliphatic or cycloaliphatic hydrocarbons, when derivatives of homopolymers or copolymers of olefins with 2 to 8 carbon atoms in the monomer molecule, and containing one anionic or electroneutral hydrophilic group for 25 to 500 carbon atoms are added to the two-phase system. The median molecular weight of said derivatives of homopolymers or copolymers of olefins is preferably in the range of 1,000 to 100,000.

According to the process of the invention there can be polymerized, either alone or in admixture with one another, all β-lactams which are unsubstituted at the nitrogen atom and carry in α- and β-position to the carbonyl group up to 4 substituents containing altogether at most 9 aliphatically bound carbon atoms or an aromatic radical and at most 6 aliphatically bound carbon atoms. The substituents may likewise be members of a common ring.

Suitable substituents are, for example, the following organic radicals: methyl, ethyl, vinyl, n-propyl, isopropyl, butyl, pentyl, neopentyl, tetramethylene, cyclopentylene-(1,3), hexyl, heptyl, octyl, nonyl, phenyl, tolyl, and diisopropylphenyl. The substituents may likewise contain hetero atoms, e.g. phenoxymethyl, chlorophenyl or aminophenyl.

Compounds which can be polymerized according to the process of the invention are, for example, azetidinone unsubstituted, 4-methyl-azetidinone,
4-ethyl-azetidinone,
4-vinyl-azetidinone,
4-isopropyl-azetidione,
4-phenyl-azetidinone,
4-methyl-4-phenoxy-methyl-azetidinone,
4-chlorophenyl-azetidinone,
3,3-dimethyl-azetidinone,
3,4-dimethyl-azetidinone,
4,4-dimethyl-azetidinone,
3,4,4-trimethyl-azetidinone,
3-methyl-4-phenyl-azetidinone,
3,3-dimethyl-4-phenyl-azetidinone,
3,3-dimethyl-4-isopropyl-azetidinone,
4-methyl-4-neopentyl-azetidinone,
3,3,4,4-tetramethyl-azetidinone, 4-(4'-isopropylcyclohexyl)-azetidinone or polycyclic lactams represented by the formulae below:

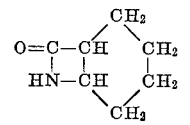

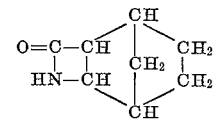

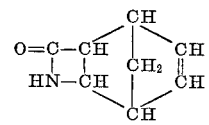

The 4-vinyl-azetidinone is prepared as described in Belgian Pat. 673,654;

4-methyl-4-phenoxy-methyl-azetidinone can, for example, be obtained by reaction of 1-phenoxymethyl-1-methylethylene with ClSO₂NCO according to conventional methods, and the polycyclic lactams are prepared as described in Belgian Pat. 662,258. All other above-numbered azetidinones are well-known compounds, prepared according to known methods.

The instant polymers of the above defined class of monomers and mixtures of monomers are suitable for being shaped into molded articles, films and filaments by the methods known for shaping poly-β-lactams, such as amply described and taught to a skilled practitioner by the disclosure in Angewandte Chemie, International Edition in English, vol. 1/1962, p. 487 et seq.

The process according to the invention can likewise be used for polymerizing mixtures of β-lactams with proportions of up to 50% of higher lactams such as α-pyrrolidone. The polymers thus obtained are of the same utility as the pure poly-β-lactams produced by the instant process.

In order to obtain high degrees of polymerization it is advantageous to carry out the polymerization by anionic mechanism. The polymerization is catalyzed by the addition of alkaline compounds producing lactam anions in the polymerization mixture. Suitable catalysts are, for example, the alkali metal compounds of β-lactams, the potassium salt of pyrrolidone, the sodium salt of ε-caprolactam, phenyl sodium, lithium hydride, potassium hydroxide, and other catalysts generally used in the anionic polymerization of lactams. Although it is possible to carry out the reaction in the presence of the above-mentioned catalysts it is likewise possible but not necessary to use adidtional chain starting agents in order to accelerate the reaction or to yield products of higher molecular weight. As chain starting agent N-acyl- or N-sulfonyl compounds of lactams can be used. The chain starting agents may likewise be produced by adding acylating or sulfonating reagents to the polymerization mixture.

The polymerization may also be carried out under the conditions of the so-called condensing polymerization in which, for example, water or hexamethylene-diamine adipate act as catalyst. In general, however, this mode of operation yields lower degrees of polymerization and requires higher temperatures. The anionic polymerization is generally carried out at a temperature in the range of from —15° C. to +120° C. while the temperature of the condensing polymerization range from 100 to 240° C.

As olefinic polymers which can be transformed into emulsifiers by the introduction of hydrophilic groups for purpose of this invention, the following are suitable as an example: polyethylene, isotactic, syndiotactic and atactic polypropylene, polyisobutylene, ethylene-propylene copolymers, ethylene-propylene bicyclopentadiene copolymers, natural and synthetic rubbers. The emulsifiers to be used according to the invention may have different molecular weights depending on the properties of the olefinic polymer, the lactam to be polymerized, the ratio of phases and the hydrocarbons used as gasoline phase. The hydrocarbon chains of the emulsifiers may be straight or branched and the hydrophilic groups may be introduced directly into the main chain or they may be introduced by grafting side chains on to the main chain.

As hydrophilic groups there enter into consideration electro-neutral and anionic functions forming a hydrophilic part of the molecule of detergents known in literature. There are mentioned by way of example carboxylic acid groups, sulfonic acid groups, sulfuric acid semi-ester groups, phosphoric acid mono-ester groups, phosphonic acid groups, phosphinic acid groups, the salts or amides thereof, amine oxide groups,[1] sulfoxide groups, acylamino groups, ester groups, the hydroxyl group and the ketone group.

Suitable emulsifiers are, for example, the following compounds: a polypropylene which was partially decomposed in the presence of oxygen at elevated temperature, said partially decomposed polypropylene having a molecular weight of about 10,000 and one carboxyl group per 300 carbon atoms; the sodium salt of a sulfoxidized ethylene-propylene-copolymer having the recurring unit $$[C_{27}H_{53}SO_3Na]$$

and a molecular weight of about 12,000; a compound having the repeating unit $$[C_{60}H_{119}OSO_3H]$$

and the molecular weight of about 3,000, prepared by by radically initiated oxidation of atactic polypropylene and subsequent reaction with oleum. Further suitable emulsifiers are obtained according to other known methods, for example, by the reaction of polyolefins with phosphortrichloride and oxygen under the irradiation of ultraviolet light and by converting the thus obtained phosphonic acid chlorides into the free acids, the salts, esters or amides thereof (see, for example DAS 1 191 577); as an example for said compounds, there may be mentioned the compound having the recurring unit $$C_{90}H_{179}PO[N(CH_3)_2]_2$$

and a molecular weight of about 2000. As an emulsifier containing acylamino groups, there may be mentioned

[1] Phosphine oxide groups.

the compound having the recurring unit and a molecular weight

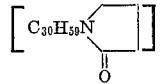

of about 5,000, obtained by copolymerization of N-vinyl-pyrrolidone and ethylene according to a conventional method.

According to the invention and for the production of high molecular weight polyamides, emulsifiers with fully substituted sulfonamide groups have proved to be especially advantageous since they have the best emulsifying effect. Suitable emulsifiers are, for example, compounds with the following recurring units and molecular weights:

Recurring units:           Molecular weight, about
- $[C_{58}H_{115}SO_2N(CH_3)_2]$ ---------- 3,000
- $[C_{27}H_{51.6}SO_2N(CH_3)_2Cl_{1.4}]$ ---------- 3,000
- $[C_{58}H_{111}SO_2N(CH_3)_2Cl_4]$ ---------- 5,000
- $[C_{58}H_{111}SO_2N(C_4H_9)_2Cl_4]$ ---------- 4,000
- $[C_{110}H_{216}SO_2N(CH_3)_2Cl_3]$ ---------- 5,000
- $[C_{35}H_{67.6}SO_2N(CH_3)_2Cl_{1.4}]$ ---------- 3,000

Said compounds are, for example, obtained by sulfochlorination of polypropylene and reaction with secondary amines according to U.S. Pat. 3,079,362, and to Belgian Pat. 663,044. Similar products are obtained by analogous reactions of ethylene-propylene copolymers. Emulsifiers with hydroxy groups, primary or secondary amide or sulfonamide groups as well as ketones may act as chain interrupting agents due to their mobile hydrogen atoms so that products having a somewhat lower degree of polymerization are obtained when emulsifiers of the latter types are used.

By the use of such emulsifiers containing chain interrupting groups the β-lactam polymer can be modified because in these cases the emulsifier is inserted at the chain end. Emulsifiers with ester functions have an analogous effect. Representative compounds of this class are obtained by reaction of sulfochlorinated olefines with ammonia NH$_3$, methylamine and other primary amines; in this way compounds homologous to the above-numbered compounds with fully substituted sulfonamide groups are obtained. Emulsifiers, containing hydroxyl or ketone groups, as formed by partial decomposition of polyolefines in the presence of oxygen, are, for example, the compounds having the following recurring units and molecular weights:

Recurring units:           Molecular weight, about
- $[C_{60}H_{118}O_2]$ ---------- 5,000
- $[C_{30}H_{60}O]$ ---------- 7,000
- $[C_{40}H_{80}O]$ ---------- 3,000

The infrared-spectra of said compounds show different amounts of hydroxyl and ketone groups.

Emulsifiers with ester functions are, for example, the compounds having the following recurring units and molecular weights:

Recurring units:           Molecular weight, about
- $[C_{27}H_{51.6}SO_2OCH_3Cl_{1.4}]$ ---------- 3,000
- $[C_{58}H_{111}SO_2OC_2H_5Cl_4]$ ---------- 4,000

By such chain interrupting emulsifiers a hydrophobization of the polymer may be obtained, the dyeability of the polymer may be improved or soiling may be reduced. These polymers, being within the class of the above defined polymers, are useful for the same purpose as the class to which they belong.

The chain interrupting action can be avoided by using compounds as emulsifiers in which the mobile hydrogen atoms have been replaced by organic radicals, preferably alkyl radicals with 1 to 18 carbon atoms.

On the average, the emulsifiers according to the invention can contain one or several, even different hydrophilic groups in the macromolecule. A representative compound of this class is, for example, a compound having the recurring units

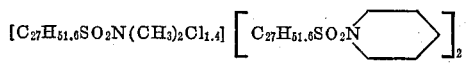

and the molecular weight about 4,000.

In general, it is of advantage to perform the polymerization with the addition of solvents which are miscible with the lactam to be polymerized, miscible to a certain extent only with the hydrocarbon phase and capable of swelling or dissolving the polymer formed. Especially suitable are, for example, dimethyl sulfoxide, dimethyl formamide, dimethyl acetamide, methyl-pyrrolidone and tetramethylene-sulfone.

When solvents of this type are added to the lactam phase, β-lactam polymers having a particularly high degree of polymerization are obtained. As dispersing agents, aliphatic or cycloaliphatic hydrocarbons can be used such as hexane, heptane, cyclohexane, 2-methylpentane, light gasoline and heavy gasoline.

The difference in density between the phases can be reduced by the addition of fluorine-containing halogenohydrocarbons to the hydrocarbon phase, as, for example, by the addition of 1,1,1-trichloro-2,2,2-trifluoro-ethane, 1,2-difluoro-tetrachloro-ethane and hexafluoro - 2,3 - dichloro-butene-2. Additions of this type are suitable when especially storable dispersions are to be produced.

The emulsifiers according to the invention are used either individually or in admixture with one another in an amount of 0.01 to 10%, preferably 0.05 to 5%, calculated on the amount of hydrocarbon used. When too high an amount of emulsifier is used, a corresponding improvement of the emulsifying action cannot be observed and the hydrocarbon phase becomes so thick that it is difficult to handle. With too low a concentration the emulsifying action becomes insufficient. Depending on the choice of the emulsifier used and its concentration, either coarse-grained dispersions, the phases of which can be readily separated for example by suction-filtration, or finely disperse of, storable suspensions are obtained. In general, it is suitable when during polymerization the hydrocarbon forms the outer phase. If, however, further reaction components shall be added to the lactam phase during polymerization, the emulsifier system can be selected in a manner such that the lactam phase first forms the outer phase until, in an advanced stage of polymerization, a phase-reversal takes place and the hydrocarbon becomes the outer phase. Whether or not the hydrocarbon shall form the outer or inner phase during definite stages of the polymerization, it can be substantially influenced by the addition of thickening agents which alone do not have a sufficient emulsifying effect and which are used in an amount which does not substantially exceed the amount of emulsifier used. The use of thickening agents is not an object of the invention.

The dispersion can be prepared by rapidly stirring the lactam phase into the hydrocarbon phase or vice versa. It is likewise possible to introduce both phases simultaneously or in portions into the reaction vessel. The catalyst is added to the lactam or the solution thereof through a mixing tube and the mixture is slowly added to the hydrocarbon phase over a period of several hours. In this manner, a continuous polymerization can be carried out in a flow tube. The phases are mixed with one another according to the usual methods, for example, by stirring, atomizing, vibration or ultrasonic agitation. The dispersion polymerization can be carried out in reaction vessels made of the usual materials such as glass, enamel or stainless steel. It is particularly advantageous to use reaction vessels lined with paraffin-like plastics such as polyethylene, polypropylene, or fluorine-containing polymers. In vessels of this type the formation of deposits on the walls is largely suppressed so that a minimum amount of emulsifier is sufficient.

The following examples serve to illustrate the invention but they are not intended to limit it thereto.

EXAMPLE 1

50 cc. of distillate were distilled off at 50° C. and under a pressure of 0.2 mm. of mercury from a mixture of 200 grams of 4,4-dimethyl-azetidinone and 500 grams of dimethyl sulfoxide. The lactam solution was cooled to 20° C., 4 grams of the potassium salt of pyrrolidone and 0.07 gram of oxalyl-pyrrolidone were dissolved in the solution while stirring. A solution of 6 grams of polypropylene-dimethyl sulfamide having the recurring unit [$C_{58}H_{115}SO_2N(CH_3)_2$], and a molecular weight of about 3,000 and 0.6 gram of polyisobutylene having a Defo hardness of 4,400 at 80° C. in 600 cc. of heavy gasoline of the boiling range of 180 to 200° C. was added while stirring.

The emulsion was formed, of which the heavy gasoline formed the outer phase. It was stirred for 4 hours at 20° C. with 200 revolutions per minute. Granules having a grain diameter of up to about 2 mm. were obtained and filtered off with suction, washed with gasoline and the adhering gasoline was distilled off with steam, while the dimethylsulfoxide was simultaneously washed out with water. The residue was again filtered off with suction and dried. 193 grams of polymer were obtained having a relative viscosity of 21.5, determined with a solution of 1 gram of substance in 100 cc. of concentrated sulfuric acid at 20° C. The polymer is suitable for being spun into films and filaments in known manner.

EXAMPLE 2

In 1 liter of a 1% solution of a dimethyl sulfamide of an ethylene propylene copolymer having the recurring unit [$C_{27}H_{51.6}SO_2N(CH_3)_2Cl_{1.4}$] and a molecular weight of about 3,000 in heavy gasoline of a boiling range of 180 to 200° C., 20 grams of 4,4-dimethyl-azetidinone were polymerized at 20° C. after the addition of 20 cc. of dimethyl sulfoxide, 2 grams of the potassium salt of pyrrolidone and 1 gram of oxalylpyrrolidone. The gasoline solution was separated from the polymer slurry.

600 cc. of the gasoline solution were stirred at 20° C. with a solution prepared as described in Example 1 of 200 grams of 4,4-dimethyl-azetidinone, 450 grams of dimethyl sulfoxide, 4 grams of the potassium salt of pyrrolidone and 0.07 gram of oxalyl-pyrrolidone. The gasoline solution became the inner phase. The mixture was stirred with 350 revolutions per minute. After about one hour phase-reversal took place. After 4 hours the fine grained polymer was freed from dimethyl sulfoxide and gasoline by distillation with steam as described in Example 1. 195 grams of polymer were obtained having a relative viscosity of 18.0, determined as in Example 1. The polymer is suitable for being spun into films and filaments in known manner.

EXAMPLE 3

2 grams of sodium sulfonate of an ethylene-propylene copolymer having the recurring unit [$C_{27}H_{51.6}Cl_{1.4}SO_3Na$] and a molecular weight of about 12,000 and 40 grams of 4,4-dimethyl-azetidinone were dissolved in 110 grams of dimethyl sulfoxide. 20 cc. of the solution were distilled off at 50° C. and under a pressure of 0.2 mm. of mercury. 1 gram of the potassium salt of pyrrolidone and 0.01 gram of oxalyl-pyrrolidone were added at 20° C. and the mixture was stirred with 350 revolutions per minute with 120 cc. of heavy gasoline having a boiling range of 180 to 200° C. An emulsion was formed in which the hydrocarbon was the inner phase. After about one hour phase-reversal took place. After 4 hours the polymer was freed from the adhering diluent by washing with benzene and acetone. The powdery polymer obtained was dried at 60° C. 38 grams of reaction product were obtained having a relative viscosity of 15.0, determined as in Example 1. The polymer is suitable for being spun into films and filaments in known manner.

EXAMPLE 4

20 cc. of distillate were distilled off under reduced pressure from a mixture of 36 grams of 4,4-dimethyl-azetidinone, 4 grams of β-lactam of the formula

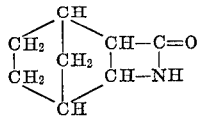

and 66 grams of dimethyl formamide. 1 gram of the potassium salt of pyrrolidone and 0.01 gram of oxalyl-pyrrolidone were added and the whole was stirred at 20° C. with 100 cc. of a 1% solution of polypropylene-dimethylsulfamide having the recurring unit $$[C_{58}H_{111}SO_2N(CH_3)_2Cl_4]$$

and a molecular weight of about 5,000 in light gasoline having a boiling range of 30–85° C. The fine granulates were filtered off with suction after 4 hours, washed with gasoline, and repeatedly boiled first with acetone and then with water. 38 grams of polymer in the form of microscopic beads were obtained having a relative viscosity of 7.9, determined with a solution of 1 gram of polymer in 100 cc. of concentrated sulfuric acid. When hexane or cyclohexane was used instead of the light gasoline, the same result was obtained. The polymer is suitable for being spun into films and filaments in known manner.

EXAMPLE 5

20 cc. of distillate were distilled off under reduced pressure from a solution of 32 grams of 4,4-dimethyl-azetidinone and 8 grams of 4-phenoxymethyl-4-methyl-azetidinone in 66 grams of dimethyl sulfoxide. 1 gram of the potassium salt of pyrrolidone and 0.022 gram of oxalyl-pyrrolidone were added to the solution. After the addition of 120 cc. of a 2% solution of polypropylene-dibutylsulfamide having the repeating unit $$[C_{58}H_{111}SO_2N(C_4H_9)_2Cl_4]$$

and a molecular weight of about 4,000 in a commercial octane mixture, the whole was stirred for 6 hours at 20° C. The obtained powder of microscopically visible beads was freed from the adhering diluent by boiling with water and dried. The yield amounted to 35 grams. The reaction product had a relative viscosity of 10.20, determined with a solution of 1 gram of substance in 100 cc. of concentrated sulfuric acid, and can be shaped into films and filaments in known manner.

EXAMPLE 6

The reaction was carried out as described in Example 5, with the exception that 2% of a polypropylene-dimethyl sulfamide having the repeating unit $$[C_{110}H_{226}SO_2N(CH_3)_2Cl_3]$$

and a molecular weight of 5,000 were added to the hydrocarbon phase instead of the sulfamide used in Example 5. A fine-grained polymer was obtained having the same relative viscosity as the product of Example 5, and being suitable for being shaped into molded articles, films and filaments in known manner.

EXAMPLE 7

The solution of 100 grams of 4-methyl-azetidinone and 0.02 gram of oxalyl-pyrrolidone in 220 grams of dimethyl sulfoxide and of 1 gram of the potassium salt of pyrrolidone in 220 grams of dimethyl sulfoxide were simultaneously dropped, through a mixing tube and while stirring, into 500 cc. of a 2% solution of atactic polypropylene, having a molecular weight of 10,000 containing one carboxyl group for 300 carbon atoms, in heavy gasoline of the boiling range of 180 to 200° C. After 4 hours the reaction mixture was filtered off with suction, and the polymer was freed from adhering diluent by blowing out with steam. 100 grams of the polymer were obtained having a relative viscosity of 10.6, determined with a solution of 1 gram of substance in 100 cc. of concentrated sulfuric acid.

In contradistinction to the hydrocarbon phases of Examples 1 to 6, the gasoline phase of the present example had lost its emulsifying property after polymerization. The polymer can be spun into films and filaments in known manner.

EXAMPLE 8

5 grams of 3,3-dimethyl-azetidinone and 0.05 gram of hexamethylene-diamine-adipate were heated for 4 hours at 170° C. while stirring together with 9 cc. of a 1% solution of a dimethyl sulfamide of an ethylene-propylene-copolymer having the repeating unit $[C_{35}H_{67.6}SO_2N(CH_3)_2Cl_{1.4}]$ and a molecular weight of about 3,000 in heavy gasoline having a boiling range of 180 to 200° C. The polymer consisting of microscopically fine beads was filtered off with suction and boiled with water. 4 grams of reaction product were obtained having a relative viscosity of 1.50, determined with a solution of 1 gram of substance in 100 cc. of concentrated sulfuric acid. The polymer can be shaped into molded articles, films and filaments from the solution and from the melt.

EXAMPLE 9

10 cc. of distillate were distilled off from a mixture of 20 grams of 4,4-dimethyl-azetidinone in 50 cc. of dimethyl sulfoxide 0.4 gram of the potassium salt of pyrrolidone and 0.01 gram of oxalyl-pyrrolidone were added at 20° C. 60 cc. of a 1% solution of a product having the recurring unit $\{C_{90}H_{179}PO[N(CH_3)_2]_2\}$ and molecular weight of about 2,000 in heavy gasoline were added to the polymerization solution while stirring and the mixture was polymerized for 4 hours at constant temperature. After boiling in acetone, 17 grams of polymer were obtained having a relative viscosity of 13.3, determined with a solution of 1 gram of substance in 10 cc. of concentrated sulfuric acid at 20° C. The polymer is suitable for being spun into films and filaments from a polymer-solution in known manner.

EXAMPLE 10

A mixture of 190 grams of 4,4-dimethyl-azetidinone and 10 grams of n-octyl-azetidinone was polymerized under the conditions indicated in Example 1. 195 grams of polymer were obtained having a relative viscosity of 11 and being suitable for being shaped into molded articles, films and filaments in known manner.

EXAMPLE 11

A mixture of 37 grams of 4-i-propyl-azetidinone and 3 grams of 3,3-dimethyl-4-phenyl-azetidinone was polymerized under the conditions indicated in Example 4. 38 grams of polymer were obtained, suitable for being spun into films and filaments in known manner.

EXAMPLE 12

0.05 gram of the potassium salt of pyrrolidone was added at 10° C. to a mixture of 10 grams of 4-vinyl-azetidinone and 40 cc. of dimethyl sulfoxide. The mixture obtained was rapidly emulsified in 80 cc. of a solution of 1% of polypropylene-dimethyl-sulfamide having the recurring unit $[C_{58}H_{111}SO_2N(CH_3)_2Cl_4]$ and a molecular weight of 3,000 and 0.1% of polyisobutylene having a Defo hardness of 4,400 in heavy gasoline of the boiling range of 160 to 180° C. and the whole was stirred for 2 hours at 20° C. The reaction product was filtered off with suction, repeatedly triturated with acetone and then with water and dried at 60° C. under reduced pressure. 10 grams of granulated polymer were obtained having a relative viscosity of 20 (1 gram of substance in 100 ml of concentrated sulfuric acid at 20° C.; the polymer can be spun into films and filaments in known manner.

We claim:
1. In a process for polymerizing a β-lactam which is unsubstituted at the nitrogen atom, said polymerization taking place in a two-phase dispersion, one of the phases consisting of aliphatic or cycloaliphatic hydrocarbons and the other phase consisting of the solution of the lactam in a strongly polar organic solvent selected from the group consisting of dimethyl sulfoxide, dimethyl formamide, dimethyl acetamide, methyl pyrrolidone and tetramethylene sulfone, said polymerization being carried out in the presence of a catalyst and an emulsifier, the improvement which comprises polymerizing a β-lactam unsubstituted at the nitrogen and using as an emulsifier for the β-lactam a derivative of a polymer of an olefin of 2 to 8 carbon atoms having a median molecular weight ranging from 1,000 to 100,000 and containing one anionic or electroneutral hydrophilic group per 25 to 500 carbon atoms wherein said hydrophilic group is a carboxylic acid group, a sulfonic acid group, a sulfuric acid semi-ester group, a phosphoric acid mono-ester group, a phosphonic acid group, a phosphinic acid group, a salt or amide thereof, an amine oxide group, a phosphine oxide group, a sulfoxide group, an acylamino group, an ester group, a hydroxy group and a ketone group.

2. The process according to claim 1 wherein the β-lactam is unsubstituted at the nitrogen atom and has in the α- and β-position to the carbonyl group up to 4 substituents containing at most 9 aliphatically bound carbon atoms.

3. The process according to claim 1 wherein the β-lactam has in the α- and β-position to the carbonyl group up to 4 substituents containing at most 6 aliphatically bound carbon atoms and an aromatic radical.

4. The process according to claim 1 wherein the β-lactam has in the α- and β-position to the carbonyl group up to 4 substituents containing at most 9 aliphatically bound carbon atoms which are partially a member of a ring.

5. The process according to claim 1 wherein the β-lactam is a member selected from the group consisting of azetidinone,
4-methyl-azetidinone,
4-ethyl-azetidinone,
4-isopropyl-azetidinone,
4-phenyl-azetidinone,
4-chlorophenyl-azetidinone,
3,3-dimethyl-azetidinone,
3,4-dimethyl-azetidinone,
4,4-dimethyl-azetidinone,
3,4,4-trimethyl-azetidinone,
3-methyl-4-phenyl-azetidinone,
3,3-dimethyl-4-phenyl-azetidinone,
3,3-dimethyl-4-isopropyl-azetidinone,
4-methyl-4-neopentyl-azetidinone,
3,3,4,4-tetramethyl-azetidinone,
4-(4'-isopropylcyclohexyl)-azetidinone,
4-vinyl--azetidinone,
4-vinyl-azetidinone, and a polycyclic lactam of a formula

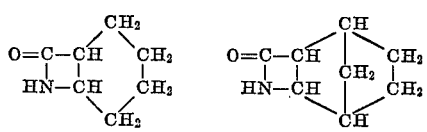

and

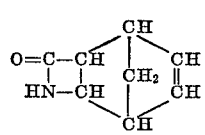

6. The process according to claim 1 wherein the β-lactam is a member selected from the group consisting of azetidinone,
4-methyl-azetidinone,
4-ethyl-azetidinone,
4-isopropyl-azetidinone,
4-phenyl-azetidinone,
4-chlorophenyl-azetidinone,
3,3-dimethyl-azetidinone,
3,4-dimethyl-azetidinone,
4,4-dimethyl-azetidinone,
3,4,4-trimethyl-azetidinone,
3-methyl-4-phenyl-azetidinone,
3,3-dimethyl-4-phenyl-azetidinone,
3,3-dimethyl-4-isopropyl-azetidinone,
4-vinyl-azetidinone,
3,3,4,4,-tetramethylazetidinone,
and a polycyclic lactam of a formula 7. The process according to claim 1 wherein the β-lactam is a member selected from the group consisting of 4-vinyl-azetidinone, 4-methyl-4-phenoxy-azetidinone, and a polycyclic lactam of a formula

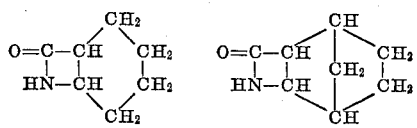

and

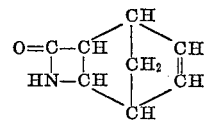

8. The process according to claim 1 wherein the anionic or electroneutral hydrophilic group of the olefin polymer is selected from a member consisting of the carboxylic acid group, the sulfonic acid group, the sulfuric ester semi-ester group, the phosphonic acid group, the salts thereof, the acid amides thereof, the acylamino group, the hydroxy group, the sulfonamide group and the carboxyl group.

9. The process according to claim 1 wherein the olefin polymer having a median molecular weight of 1,000 to 100,000 contains a sulfonamide group per 25 to 500 carbon atoms, in which sulfonamide group atoms are replaced by alkyl radicals from 1 to 18 carbon atoms.

10. In a process for polymerizing β-lactams which are unsubstituted at the nitrogen atom, said polymerization taking place in a two-phase dispersion, one of the phases consisting of aliphatic or cycloaliphatic hydrocarbons and the other phase cosisting of the solution of the lactams in a strongly polar organic solvent selected from the group consisting of dimethyl sulfoxide, dimethyl formamide, dimethyl acetamide, methyl pyrrolidone and tetra-methylene sulfone, said polymerization being carried out in the presence of a catalyst, and an emulsifier, the improvement which comprises polymerizing a mixture of at least two β-lactams unsubstituted at the nitrogen and using as an emulsifier a derivative of a polymer of an olefin of 2 to 8 carbon atoms having a median molecular weight ranging from 1,000 to 100,000 and containing one anionic or electroneutral hydrophilic group per 25 to 500 carbon atoms wherein said hydrophilic group is a carboxylic acid group, a sulfonic acid group, a sulfuric acid semi-ester group, a phosphoric acid mono-ester group, a phosphonic acid group, a phosphinic acid group, a salt or amide thereof, an amine oxide group, a phosphine oxide group, a sulfoxide group, an acylamino group, an ester group, a hydroxyl group and a ketone group.

11. The process according to claim 10 wherein the β-lactams are unsubstituted at the nitrogen atom and have in the α- and β-position to the carbonyl group up to 4 substituents containing at most 9 aliphatically bound carbon atoms.

12. The process according to claim 10 wherein the β-lactams have in the α- and β-position to the carbonyl group up to 4 substituents containing at most 6 aliphatically bound carbon atoms and an aromatic radical.

13. The process according to claim 10 wherein the β-lactams have in the α- and β-position to the carbonyl group up to 4 substituents containing at most 9 aliphatically bound carbon atoms which are partially a member of a ring.

14. The process according to claim 10 wherein the β-lactams are members selected from the group consisting of azetidinone,
4-methyl-azetidinone,
4-ethyl-azetidinone,
4-isopropyl-azetidinone,
4-phenyl-azetidinone,
4-chlorophenyl-azetidinone,
3,3-dimethyl-azetidinone,
3,4-dimethyl-azetidinone,
4,4-dimethyl-azetidinone,
3,4,4-trimethyl-azetidinone,
3-methyl-4-phenyl-azetidinone,
3,3-dimethyl-4-phenyl-azetidinone,
3,3-dimethyl-4-isopropyl-azetidinone,
4-methyl-4-neopentyl-azetidinone,
3,3,4,4-tetramethyl-azetidinone,
4-(4'-isopropylcyclohexyl)-azetidinone,
4-vinyl-azetidinone,
4-methyl-4-phenoxymethyl-azetidinone, and a polycyclic lactam of a formula

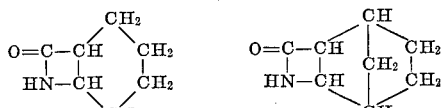

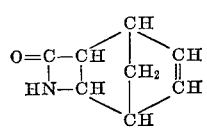

15. The process according to claim 10 wherein the β-lactams are members selected from the group consisting of azetidinone,
4-ethyl-azetidinone,
4-methyl-azetidinone,
4-isopropyl-azetidinone,
4-phenyl-azetidinone,
4-chlorophenyl-azetidinone,
3,3-dimethyl-azetidinone,
3,4-dimethyl-azetidinone,
4,4-dimethyl-azetidinone,
3,4,4-trimethyl-azetidinone,
3-methyl-4-phenyl-azetidinone,
3,3-dimethyl-4-phenyl-azetidinone,
3,3-dimethyl-4-isopropyl-azetidinone,
4-methyl-4-neopentyl-azetidinone,
3,3,4,4-tetramethylazetidinone, and
4-(4'-isopropylcyclohexyl)azetidinone.

16. The process according to claim 10 wherein the β-lactams are members selected from the group consisting of 4 - vinyl-azetidinone, 4 - methyl-4-phenoxy-azetidinone, and a polycyclic lactam of a formula

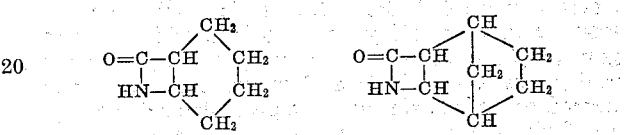

and

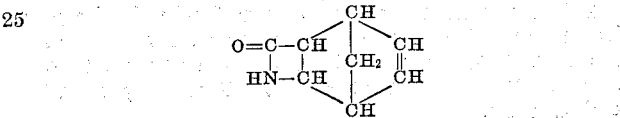

17. The process according to claim 10 wherein the anionic or electroneutral hydrophilic group of the olefin polymer is selected from a member consisting of the carboxylic acid group, the sulfonic acid group, the sulfuric ester-semiester group, the prosphonic acid group, the salts thereof, the acid amides thereof, the acylamino group, the hydroxy group, the sulfonamide group and the carboxyl group.

18. The process according to claim 10 wherein the olefin polymer having a median molecular weight of 1,000 to 100,000 contains a sulfonamide group per 25 to 500 carbon atoms in which both amide hydrogen atoms are replaced by alkyl radicals from 1 to 18 carbon atoms.

References Cited

UNITED STATES PATENTS 3,298,977　1/1967　Robertson et al. ———— 260—3
3,417,163　12/1968　Beermann et al. ———— 260—857

WILLIAM H. SHORT, Primary Examiner

L. M. PHYNES, Assistant Examiner